US012724885B2

(12) United States Patent
Rodriguez Bravo et al.

(10) Patent No.: US 12,724,885 B2
(45) Date of Patent: Sep. 1, 2026

(54) KEYPAD SECURITY

(71) Applicant: Kyndryl, Inc., New York, NY (US)

(72) Inventors: Cesar Augusto Rodriguez Bravo, Alajuela (CR); Carolina Garcia Delgado, Zapopan (MX); David Alonso Campos Batista, Aurora (CR); Desilda Toska, Alajuela (CR)

(73) Assignee: KYNDRYL, INC., New York, NY (US)

( * ) Notice: Subject to any disclaimer, the term of this patent is extended or adjusted under 35 U.S.C. 154(b) by 144 days.

(21) Appl. No.: 18/736,772

(22) Filed: Jun. 7, 2024

(65) Prior Publication Data

US 2024/0330449 A1 Oct. 3, 2024

Related U.S. Application Data

(62) Division of application No. 17/508,023, filed on Oct. 22, 2021, now Pat. No. 12,039,041.

(51) Int. Cl.
*G06F 21/00* (2013.01)
*G06F 21/55* (2013.01)
*H04N 7/18* (2006.01)

(52) U.S. Cl.
CPC .......... *G06F 21/554* (2013.01); *H04N 7/188* (2013.01); *G06F 2221/031* (2013.01)

(58) Field of Classification Search
CPC .. H04N 7/188; G06F 21/554; G06F 2221/031
See application file for complete search history.

(56) References Cited

U.S. PATENT DOCUMENTS

| | | | |
|---|---|---|---|
| 6,107,930 | A | 8/2000 | Behlke et al. |
| 8,517,261 | B2 | 8/2013 | Ramachandran et al. |
| 9,697,384 | B2 | 7/2017 | Dow et al. |
| 2006/0169764 | A1 | 8/2006 | Ross et al. |

(Continued)

FOREIGN PATENT DOCUMENTS

| | | |
|---|---|---|
| WO | 2002091143 | 11/2002 |
| WO | 2010123471 | 10/2010 |

OTHER PUBLICATIONS

Al Hattali et al., “Design and development for detection and prevention of ATM skimming frauds”, Mar. 3, 2020, 8 pages.

(Continued)

*Primary Examiner* — Tri M Tran
(74) *Attorney, Agent, or Firm* — Erik Swanson; Andrew D. Wright; Calderon Safran & Wright P.C.

(57) ABSTRACT

A method for detecting a fake keypad includes: monitoring outputs of plural magnetic field sensors connected to a keypad; detecting the output of at least one of the magnetic field sensors indicates the presence of a magnetic field; starting, in response to the detecting, a timer; determining the first timer reaches a first threshold while the output of the at least one of the magnetic field sensors still indicates the presence of a magnetic field; in response to the timer reaching the first threshold, determining a number of the magnetic field sensors whose output indicates the presence of a magnetic field equals or exceeds a second threshold; in response to the number of the magnetic field sensors equaling or exceeding the second threshold, determining a security action; and initiating the security action.

20 Claims, 5 Drawing Sheets

(56) References Cited

U.S. PATENT DOCUMENTS

| | | | |
|---|---|---|---|
| 2013/0037614 | A1 | 2/2013 | Criscitiello |
| 2013/0221989 | A1 | 8/2013 | Schimbaeck et al. |
| 2015/0293592 | A1 | 10/2015 | Cheong |
| 2016/0155106 | A1 | 6/2016 | Streuter |
| 2019/0035231 | A1 | 1/2019 | Hodges et al. |
| 2019/0253250 | A1* | 8/2019 | Bruner .................. G06F 21/445 |
| 2019/0355222 | A1 | 11/2019 | Astigarraga et al. |
| 2019/0384431 | A1 | 12/2019 | Berger |
| 2020/0089364 | A1 | 3/2020 | Bytheway |

OTHER PUBLICATIONS

Kim et al., "A Novel Metal Foreign Object Detection for Wireless High-Power Transfer Using a Two-Layer Balanced Coil Array with a Serial-Resonance Maxwell Bridge", www.mdpi.com/journal/electronics, Dec. 4, 2020, 15 pages.

Anonymous, "I Am The NCR Skimming Protection Solution", accessed Aug. 5, 2021, 2 pages.

Anonymous, "Anti-Skim protection DIP and Motorized Card Readers", https://www.cumminsallison.com/us/en/products/atm/anti-skim, accessed Aug. 2, 2021, 3 pages.

Erickson, "15 Ways to Fake That You Have a Home Security System and Deter Burglars", https://www.familyhandyman.com/list/ways-to-fake-that-you-have-a-home-security-system-and-deter-burglars/, Nov. 1, 2018, 21 pages.

Anonymous, "Rare-earth magnet", https://en.wikipedia.org/wiki/Rare-earth_magnet, accessed Oct. 27, 2021, 7 pages.

Anonymous, "Risk appetite", https://en.wikipedia.org/wiki/Risk_appetite, accessed Oct. 27, 2021, 3 pages.

Anonymous, "Physical Security Market Size, Share & Trends Analysis Report By Component, By Systems (Video Surveillance, Access Control, Intrusion Detection), By Services, By End Use, By Region, And Segment Forecasts, 2020 -2027", https://www.grandviewresearch.com/industry-analysis/physical-security-market, Feb. 2020, 7 pages.

Anonymous, "Accelerate digital growth by building trust in digital identity", https://www.ibm.com/es-es/security/fraud-protection/trusteer, accessed Oct. 27, 2021, 10 pages.

List of Kyndryl Patents or Patent Applications Treated as Related, dated Jun. 7, 2024, 2 pages. .

* cited by examiner

KEYPAD SECURITY

BACKGROUND

Aspects of the present invention relate generally to electronic device security and, more particularly, to keypad security.

A keypad is an electronic device with a block or pad of buttons set with an arrangement of digits, symbols, or alphabetical letters. Keypads are commonly used to control access to areas by forcing a user to enter a code into the keypad in order to gain entry into the area. Keypads are also used on automated teller machines (ATMs) in banking.

SUMMARY

In a first aspect of the invention, there is a computer-implemented method including: monitoring, by a computing device, outputs of plural magnetic field sensors connected to a keypad; detecting, by the computing device, the output of at least one of the magnetic field sensors indicates the presence of a magnetic field; starting, by the computing device and in response to the detecting, a timer; determining, by the computing device, the first timer reaches a first threshold while the output of the at least one of the magnetic field sensors still indicates the presence of a magnetic field; in response to the timer reaching the first threshold, determining, by the computing device, a number of the magnetic field sensors whose output indicates the presence of a magnetic field equals or exceeds a second threshold; in response to the number of the magnetic field sensors equaling or exceeding the second threshold, determining, by the computing device, a security action; and initiating, by the computing device, the security action.

In another aspect of the invention, there is a computer program product including one or more computer readable storage media having program instructions collectively stored on the one or more computer readable storage media. The program instructions are executable to: monitor for a signal from at least one sensor in an array of sensors located in predetermined positions associated with a surface of the device; in response to the monitoring, detect the signal from the at least one sensor indicating activation of the at least one sensor; initiate a timer in response to the activation of the at least one sensor; determine a number of sensors activated in the array of sensors; determine whether the number of sensors activated exceeds a threshold sensor number; in response to a determination the number of sensors activated exceeds the threshold sensor number and a value of the timer exceeds a threshold timer value, determine a security action; and initiate the security action.

In another aspect of the invention, there is system including a processor, a computer readable memory, one or more computer readable storage media, and program instructions collectively stored on the one or more computer readable storage media. The program instructions are executable to: monitor for a signal from at least one sensor in an array of sensors located in predetermined positions associated with a surface of a keypad, wherein each of the sensors is a magnetic field sensor; in response to the monitoring, detect the signal from the at least one sensor indicating activation of the at least one sensor; initiate a timer in response to the activation of the at least one sensor; determine a number of sensors activated in the array of sensors; determine whether the number of sensors activated exceeds a threshold sensor number; in response to a determination the number of sensors activated exceeds the threshold sensor number and a value of the timer exceeds a threshold timer value, determine a security action; and initiate the security action.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
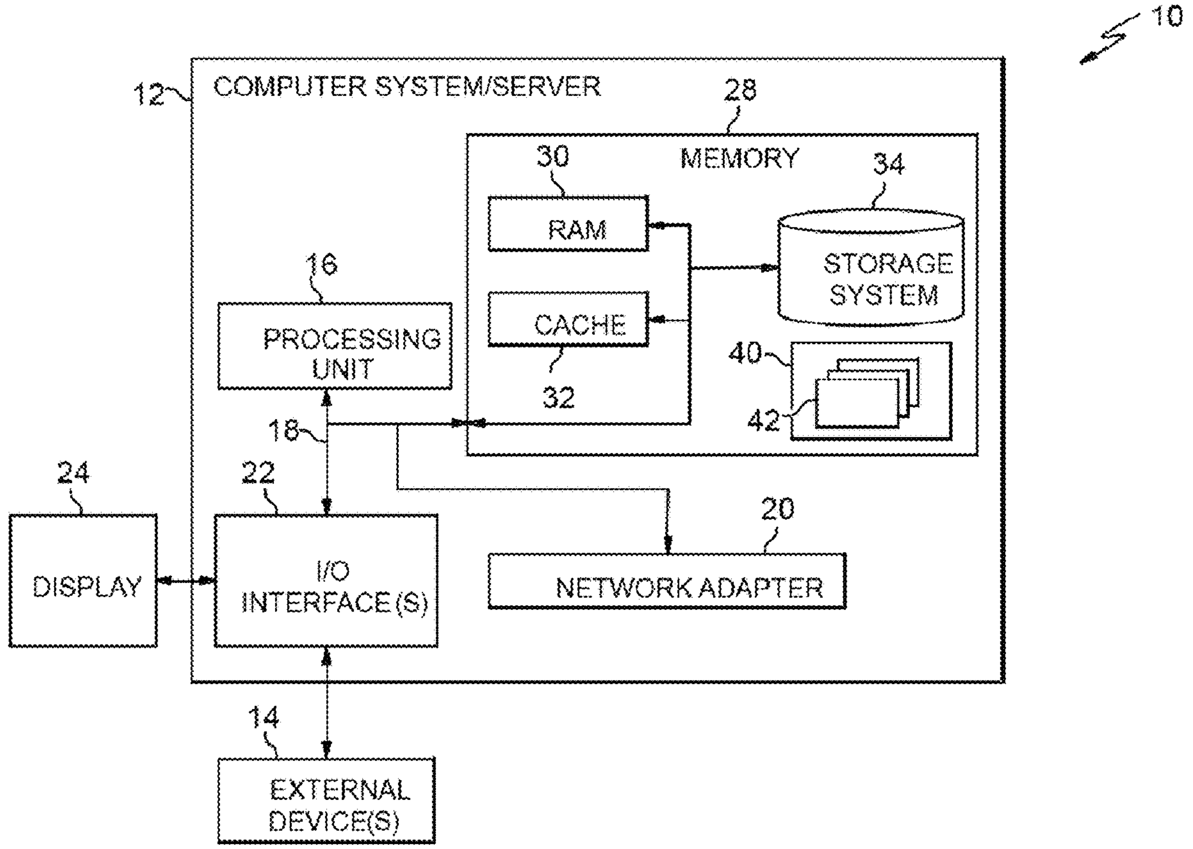
FIG. 1 depicts a computer infrastructure according to an embodiment of the present invention.

Aspects of the present invention relate generally to electronic device security and, more particularly, to keypad security. According to aspects of the invention, fake keypads are detected using magnetic field sensors. In embodiments, an authentic keypad is provided with plural magnetic field sensors that are configured to detect when a fake keypad is magnetically attached to the authentic keypad. A system utilizes output from the sensors, a timer, first and second thresholds, and a predefined risk appetite to determine when a detected event is a false positive and when a detected event is a security threat to the keypad. In this manner, implementations of the invention can be used to detect when a fake keypad is magnetically attached to the authentic keypad while minimizing false positive alerts.

Fake keypads that are placed on an authentic keypad are used to obtain security codes from unsuspecting users who think they are entering their code on the authentic keypad. Fake keypads often contain electronics that store access codes in memory so that the access codes can be retrieved later by a person who placed the fake keypad on the authentic keypad. Codes obtained in this manner can be used to gain unauthorized access to controlled areas (e.g., via a door that is locked using the authentic keypad) or financial accounts (e.g., in the case of an ATM). Therefore, fake keypads represent a security threat in terms of both physical space and electronic accounts.

Fake keypads may be attached to an authentic keypad using strong magnets, such as rare earth magnets. In one example, a fake keypad with strong magnets on its back side is placed directly on and over the outward facing surface of an authentic keypad. In this example, the magnets provide a strong bond that keeps the fake keypad connected to the authentic keypad. The fake keypad covers the authentic keypad so that a user does not realize they are entering their code on the fake keypad instead of the authentic keypad. Magnets are used instead of glue or other such adhesive because glue has a sticky feeling that can alert users to the presence of the fake keypad on the authentic keypad. Glue can also cause the buttons of the fake keypad and/or those of the authentic keypad to become stuck and inoperable.

Glue can also lose its adherence over time, e.g., due to dirt, dust, and other environmental factors, which can cause the fake keypad to shift relative to the authentic keypad, thereby alerting users to the presence of the fake keypad on the authentic keypad. Based on this, implementations of the invention are directed to addressing the security threat posed by fake keypads that are held to an authentic keypad using magnets.

Aspects of the invention address this threat by leveraging magnetic field sensors in an authentic keypad, the sensors being configured to detect a magnetic field generated by one or more magnets that are used to connect a fake keypad to the authentic keypad. An example of the magnetic field sensors used in embodiments is a Hall effect sensor. A Hall effect sensor (also called a Hall sensor) is a type of sensor which detects the presence and magnitude of a magnetic field using the Hall effect. The output voltage of a Hall sensor is directly proportional to the strength of the magnetic field. Embodiments are not constrained to using a Hall sensor, however, and may use other types of magnetic field sensors including but not limited to magneto-diode, magneto-transistor, AMR magnetometer, GMR magnetometer, magnetic tunnel junction magnetometer, magneto-optical sensor, Lorentz force-based MEMS sensor, Electron Tunneling based MEMS sensor, and MEMS compass.

According to an aspect of the invention, there is a computer-implemented process for detecting an overlay on a device, the computer-implemented process comprising: monitoring for a signal from at least one sensor in an array of sensors located in predetermined positions associated with a surface of the device; in response to the monitoring, detecting the signal from the at least one sensor indicating activation of the at least one sensor; initiating a timer in response to the activation of the at least one sensor; determining a number of sensors activated in the array of sensors; determining whether the number of sensors activated exceeds a first predetermined threshold; determining whether a value of the timer exceeds a second predetermined threshold; in response to a determination the number of sensors activated exceeds the first predetermined threshold and the value of the timer exceeds the second predetermined threshold, calculating a risk value; assigning a level of risk using the risk value calculated and predetermined risk criteria; and in response to the level of risk assigned, selecting an action from a set of actions including disabling the device, triggering an alert and execute another security subsystem for further validation.

Implementations of the invention thus provide a system that determines a group of risk areas based on activation of sensors feeds and timer correlation (e.g., a determination risk area engine). Implementations of the invention further provide a system that correlates a plurality of sensor responses against a group of risk areas to determine the security actions to be performed by the system. In this manner, implementations of the invention utilize magnetic sensing capabilities to detect fake keypads.

Implementations of the invention provide an improvement in the technology of keypads by providing a technical solution to the technical problem of security threats posed by fake keypads. In embodiments, the technical solution includes magnetic field sensors and a computing device that utilizes output from the sensors, a timer, first and second thresholds, and a predefined risk appetite to determine when a detected event is a fake keypad or a false positive.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
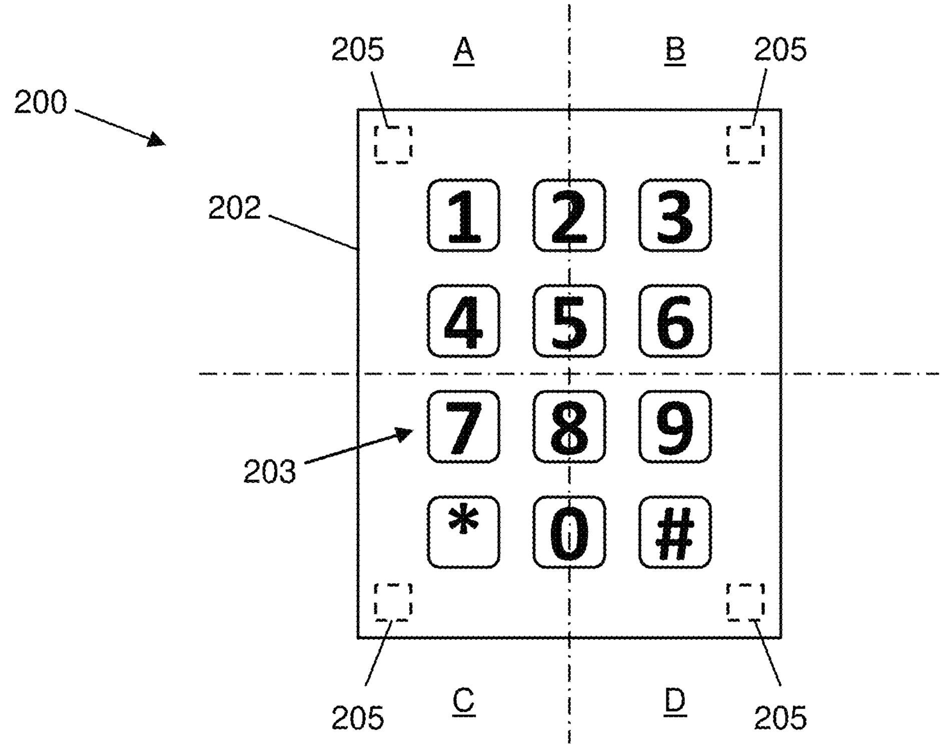
FIG. 2 shows a diagram of an exemplary keypad in accordance with aspects of the invention.

FIG. 2 shows a diagram of an exemplary keypad 200 in accordance with aspects of the invention. The keypad 200 includes a body 202 and buttons 203. The body 202 may comprise a plate with holes that the buttons 203 extend through. In embodiments, the keypad 200 is an authentic keypad that is used to control access to an area or an electronic account. For example, the keypad 200 may be part of an electronic lock for a door, and a user may unlock the door by entering a predefined authorization code using the buttons 203. In another example, the keypad 200 may be part of an ATM, and a user may access their bank account using the ATM by entering a predefined authorization code (sometimes called a personal identification number or PIN) using the buttons 203.

According to aspects of the invention, the keypad 200 includes plural magnetic field sensors 205 at different locations in or on the body 202. In the example shown in FIG. 2, there are four sensors 205 arranged at the four corners of the body 202, such that each of the sensors is in one of four respective areas A, B, C, D defined by lines that bisect the keypad vertically and horizontally. Other numbers of sensors 205 may be used, and the sensors 205 may be located differently than shown in FIG. 2. In embodiments, each of the sensors is a Hall sensor, although other types of magnetic field sensors may be used. In embodiments, the sensors 205 are hidden from view so that the sensors 205 are not visible to a person looking at and using the buttons 203. In one example, the sensors 205 are embedded in the body 202, e.g., in holes formed in the body 202, and covered by a film or veneer. In another example, the sensors 205 are behind the body 202, e.g., relative to the outer surface that is seen by a user looking at and using the buttons 203.

Figure 3:
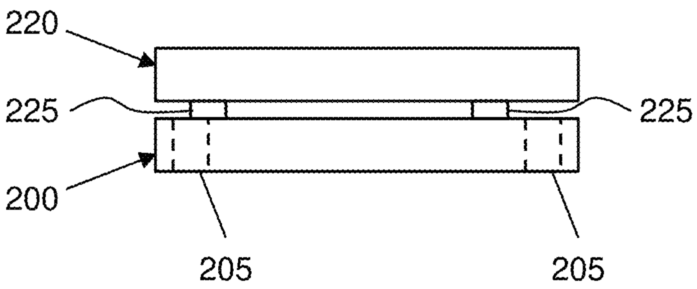
FIG. 3 illustrates a situation in which a fake keypad is connected to an authentic keypad in accordance with aspects of the invention.

FIG. 3 illustrates the situation in which a fake keypad 220 is connected to the keypad 200 by one or more magnets 225. FIG. 3 is a diagrammatic side view of the keypad 200 that is shown in plan view in FIG. 2. As shown in FIG. 3, the magnets 225 may overlap the sensors 205 or may be spaced apart from the sensors 205. The fake keypad 220 arranged in this manner may be used to obtain a code of a user who unwittingly enters the code by pressing the buttons of the fake keypad 220 while thinking they are pressing the buttons of the keypad 200. In this manner, the fake keypad 220 poses a security threat to whatever system the keypad 200 is intended to protect.

Implementations of the invention address this problem presented by fake the keypad 220 by using the sensors 205 to detect the magnets 225 that hold the fake keypad 220 to the keypad 200. In embodiments, the keypad 200 validates a plurality of zones (in this example four zones A, B, C, D) to determine if a magnet 225 is detected in each respective zone. In embodiments, a monitoring engine correlates the output of the sensors to reduce false positives. In one example, the correlation engine works based on risk areas such as a high-risk area, medium risk area, and low risk area. In this example, for a high-risk area, the correlation engine triggers an alert if at least one of the sensors 205 detects a magnetic field. In this same example, for a medium-risk area, the correlation engine triggers an alert if 50% or more of the sensors 205 detect a magnetic field. In this same example, for a low-risk area, the correlation engine triggers an alert if 90% or more of the sensors 205 detect a magnetic field. In this manner, different risk tolerance levels for may be defined using the different risk areas.

In accordance with aspects of the invention, the system checks if the status of the sensors 205 is inactive (meaning that no magnetic field is detected). The system then determines how many sensors detect a magnetic field. Depending on the percentage of sensors activated (detecting a magnetic field), the system determines whether to accept the input to the keypad 200. Security actions can be configured depending on the risk area, with some examples being: disable the keypad 200; trigger an alert to another device, such as a user device; and execute an alternate or secondary security subsystem for further validation.

In accordance with aspects of the invention, the system includes an engine that is configured to determine risk areas based on: percentage or number of sensors activated; and activation time (the system may have a timer that will be activated once each sensor is activated). In embodiments, the system includes a false positive engine that performs a continuous correlation between the sensor activation and timer to reduce false positives and adjust of risk areas. In embodiments, the system determines the risk areas based on those values plus a user configured matrix based on risk appetite.

Figure 4:
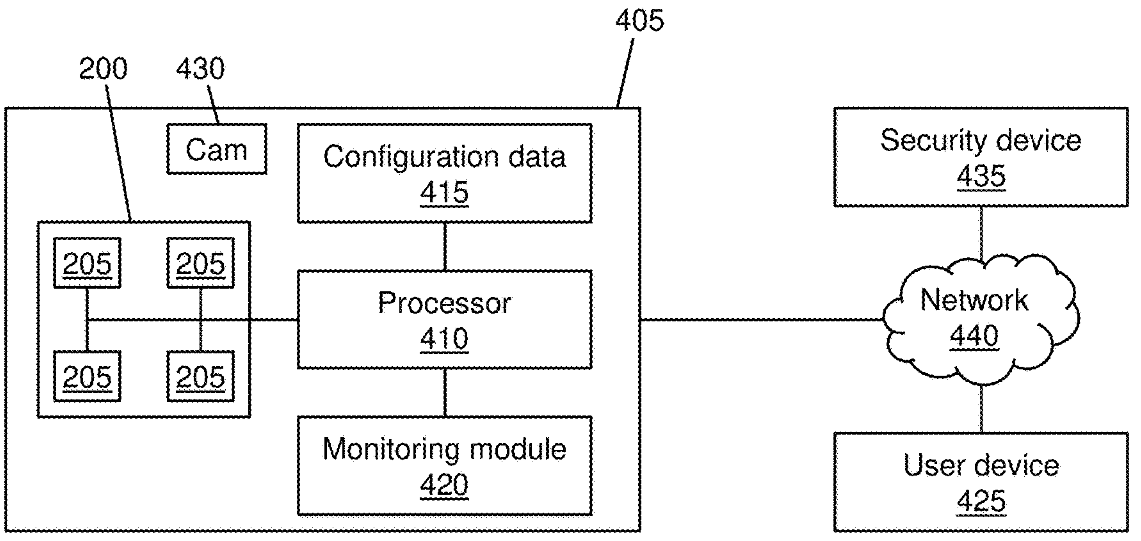
FIG. 4 shows a block diagram of an exemplary system in accordance with aspects of the invention.

FIG. 4 shows a block diagram of an exemplary system in accordance with aspects of the invention. The system includes a device 405 that the keypad 200 (of FIG. 2) is a part of or to which the keypad 200 operatively connected. In embodiments, the keypad 200 is used to authenticate users who use the device 405 in a manner that provides control of access to the device 405. In one example, the device 405 is an electronic lock for a door, and a user may unlock the door by entering a predefined authorization code using the buttons of the keypad 200. In another example, the device 405 is an ATM, and a user may access their bank account using the ATM by entering a predefined authorization code using the buttons of the keypad 200. These examples are not limiting, and the device 405 may be other types of devices that use the keypad 200 to control access.

As shown in FIG. 4, the keypad 200 includes plural magnetic field sensors 205 that are configured to detect a magnetic field of one or more magnets that are used to attach a fake keypad to the keypad 200 (e.g., in the manner illustrated in FIG. 3).

In embodiments, the device 405 includes a processor 410, configuration data 415, and a monitoring module 420. The processor 410 is a processing unit such as processor 16 of FIG. 1. The configuration data 415 is stored in memory such as storage system 34 of FIG. 1. The monitoring module 420 may comprise one or more program modules 42 of FIG. 1. The sensors 205 may be connected to the processor 410 by an interconnect such as bus 18 of FIG. 1. In this manner, the processor 410 may receive the respective outputs of the individual sensors 205 and execute the monitoring module 420 using the outputs to perform one or more functions described herein, such as the functions described with respect to FIG. 6.

According to aspects of the invention, the monitoring module 420 monitors the outputs of the sensors 205 to determine when one or more of the sensors 205 detects a magnetic field. In embodiments, the baseline (e.g., expected) state of the system is that none of the sensors detect a magnetic field since this is the case when there is no fake keypad on the keypad 200. In embodiments, the monitoring module 420 is configured to detect a change from this baseline state by detecting when the output of any one or more of the sensors 205 changes to a state of detecting a magnetic field, which indicates the presence of a magnet near that sensor.

In accordance with aspects of the invention, in response to detecting the output of one or more of the sensors 205 changes to a state of detecting a magnetic field, the monitoring module 420 starts a timer. The timer is a computer-based timer and may be implemented by the monitoring module 420 or the processor 410, for example. In embodiments, the monitoring module 420 continues to check that at least one sensor output indicates a magnetic field while waiting for the timer to reach a threshold time value. In embodiments, if all of the sensor outputs return to the baseline state (i.e., no magnetic field) prior to the timer reaching the first threshold, then this is indicative of a temporary event and not indicative of a fake keypad being placed on the keypad 200. In this situation, the monitoring module 420 reverts to monitoring the outputs of the sensors 205 to detect a change from the baseline state and does not initiate a security action since this is deemed a temporary event and not a fake keypad. For example, a user who is utilizing the keypad 200 may have a device (other than a fake keypad) that emits a magnetic field, and this device may temporarily come into close proximity of the keypad 200 while the user is entering their code on the keypad 200, thus causing the output of one or more of the sensors 205 to indicate the presence of a magnetic field. In this situation, the person leaves the vicinity of the keypad 200 within a short time after interacting with the keypad 200, taking with them whatever device caused the magnetic field, and the output of the sensor goes back to indicating no magnetic field. In this manner, the system reduces false positives by ignoring events whose duration is less than the threshold time value. In embodiments, the threshold time value is configurable and saved in the configuration data 415. Examples of the threshold time value include but are not limited to three minutes, five minutes, ten minutes, etc.

With continued reference to FIG. 4, in implementations the monitoring module 420 continues to increment the timer as long as at least one sensor indicates a magnetic field and until the timer reaches the threshold time value. In response to the timer reaching the threshold time value, the monitoring module 420 then determines a number of the sensors 205 whose output currently indicates a magnetic field and compares this number to a threshold sensor number. In the event the number of sensors currently indicating a magnetic field is less than the threshold sensor number, then the monitoring module 420 deems this a false positive and reverts to monitoring the outputs of the sensors 205 to detect a change from the baseline state and does not initiate a security action. On the other hand, in the event the number of sensors currently indicating a magnetic field equals or exceeds the threshold sensor number, then the monitoring module 420 deems this event as a security threat (e.g., a high likelihood of a fake keypad having been placed on the keypad 200), determines a security action, and initiates the security action.

In embodiments, the threshold sensor number is configurable and saved in the configuration data 415. In accordance with aspects of the invention, the threshold sensor number is set based on a risk appetite level. Risk appetite is the level of risk that the organization that owns, operates, or controls the device 405 is prepared to accept before taking action to reduce the risk. On the one hand, a relatively lower risk appetite means that the organization will tolerate less risk before taking action to reduce the risk. On the other hand, a relatively higher risk appetite means that the organization will tolerate more risk before taking action to reduce the risk. In the context of aspects of the invention, an organization with a lower risk appetite for the device 405 may set the threshold sensor number at a relatively low value (e.g., a value of one when there are four sensors 205), an organization with a medium risk appetite for the device 405 may set the threshold sensor number at a relatively medium value (e.g., a value of two when there are four sensors 205), and an organization with a higher risk appetite for the device 405 may set the threshold sensor number at a relatively high value (e.g., a value of four when there are four sensors 205). Similarly, a same organization might have plural different devices 405 with the keypad 200 and might set the threshold sensor number at different numbers for the different devices 405 based on different risk appetite for the different devices 405.

Still referring to FIG. 4, in implementations the security action is defined in the configuration data 415. In embodiments, the security action includes one or more of: disabling the keypad 200; sending an alert to a user device 425; activating an internal security device such as a camera 430 that is integrated with the device 405; and activating an external security device 435 such as a camera that is pointed at the device 405 but that is not part of or connected to the device 405. Other security actions may also be defined for use in implementations. In embodiments, the device 405, the user device 425, and the external security device 435 are connected to a network 440, which may be one or more of a LAN, WAN, and the Internet, or combinations thereof. In this manner, the monitoring module 420 may cause the device to 405 to initiate one or more security actions using communications over the network 440.

In embodiments, the monitoring module 420 determines and initiates different security actions based on different numbers of sensors 205 indicating a magnetic field. For example, the total number of sensors 205 in the device 405 may be four and the threshold sensor number may be set at three. In this example, the threshold sensor number can be equaled or exceeded either when three of the four sensors indicate a magnetic field or when four of the four sensors indicate a magnetic field. In this example, a first security action may be defined for when only three of the four sensors indicate a magnetic field, and a second security action different from the first security action may be defined for when four of the four sensors indicate a magnetic field. For example, the first security action may be a relatively lower-level security action such as alerting a user device 425, and the second security action may be a relatively higher-level security action such as a combination of alerting a user device 425 and disabling the keypad 200.

Figure 5:
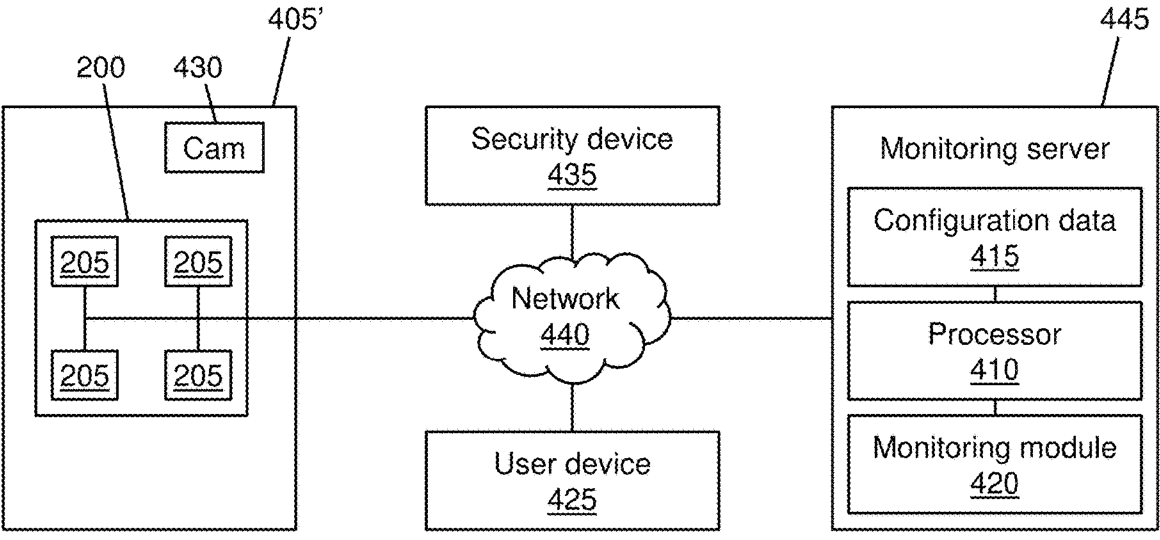
FIG. 5 shows a block diagram of another exemplary system in accordance with aspects of the invention.

FIG. 5 shows a block diagram of another exemplary system in accordance with aspects of the invention. The system shown in FIG. 5 includes elements similar to those shown in the system in FIG. 4. However, in the system in FIG. 4 the processor 410, configuration data 415, and monitoring module 420 are included in the device 405, whereas in the system in FIG. 5 the processor 410, configuration data 415, and monitoring module 420 are included in a monitoring server 445 that is remote from the device 405' and is connected to the device 405' via the network 440. The monitoring server 445 is a computing device and may include one or more elements of the computer system 12 of FIG. 1.

In the system shown in FIG. 4, the device 405 may include additional or fewer modules than those shown. Similarly, in the system shown in FIG. 5, the monitoring server 445 may include additional or fewer modules than those shown. In both systems, the functions performed by separate modules may be integrated into a single module. Additionally, or alternatively, the functions performed a single module may be implemented as multiple modules. Moreover, the quantity of devices and/or networks in the environment is not limited to what is shown in FIGS. 4 and 5. In practice, the environment may include additional devices and/or networks; fewer devices and/or networks; different devices and/or networks; or differently arranged devices and/or networks than illustrated in FIGS. 4 and 5.

Figure 6:
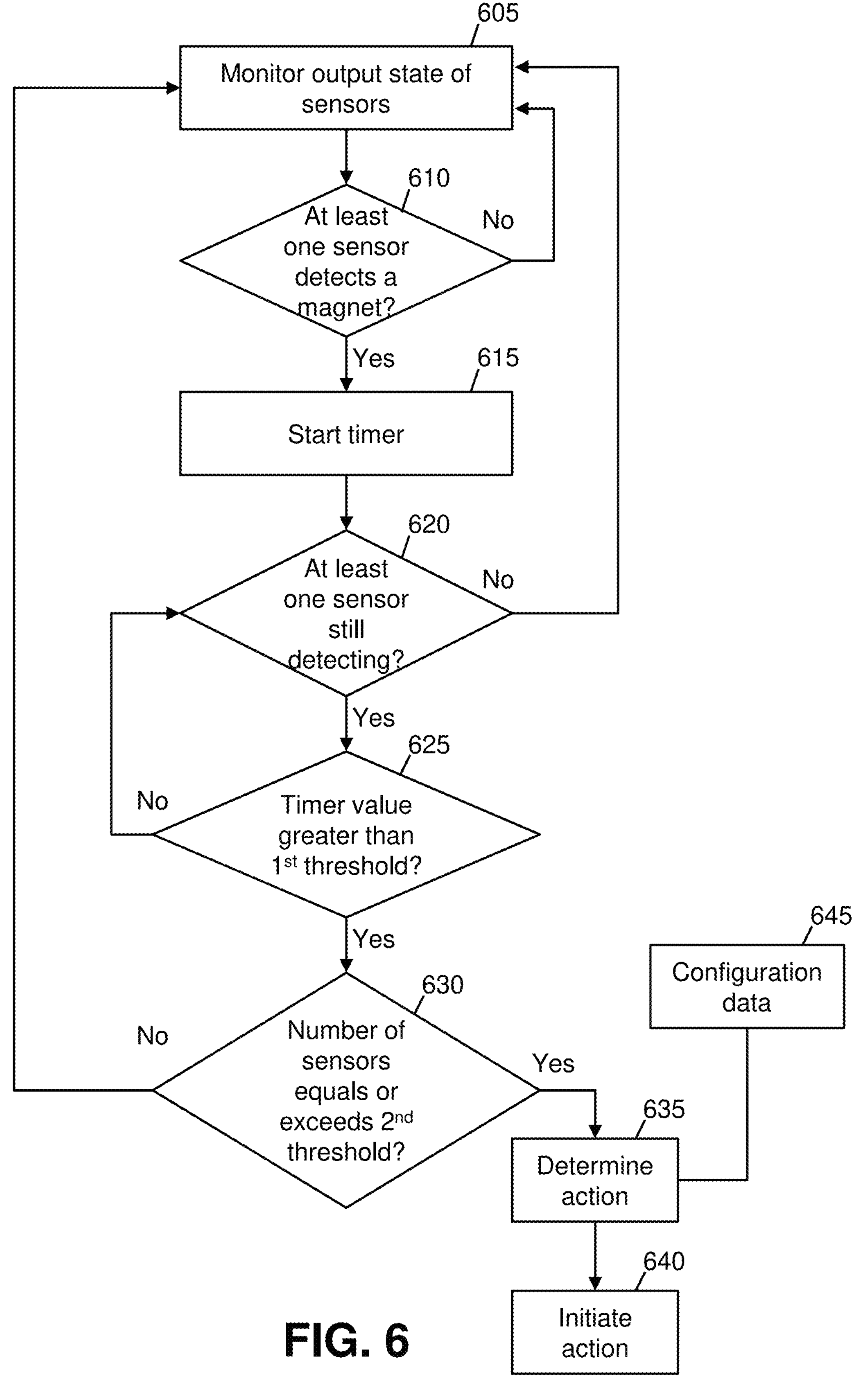
FIG. 6 shows a flowchart of an exemplary method in accordance with aspects of the invention.

FIG. 6 shows a flowchart of an exemplary method in accordance with aspects of the present invention. Steps of the method may be carried out in the environments of FIGS. 4 and 5 and are described with reference to elements depicted in FIGS. 4 and 5.

At step 605, the system monitors the output states of plural magnetic field sensors in a keypad. In embodiments, and as described with respect to FIG. 4, the monitoring module 420 monitors the output of the sensors 205 to detect when the output of any one or more of the sensors 205 changes to a state of detecting a magnetic field, which indicates the presence of a magnet near that sensor.

At step 610, if the output of none of the sensors indicates the presence of a magnetic field, then the system returns to step 605 and continues monitoring. At step 610, if the output of at least one of the sensors indicates the presence of a magnetic field, then the system starts a timer at step 615.

At step 620, after starting the timer at step 615 the system determines whether at least one sensor still indicates a magnetic field. In embodiments, and as described with respect to FIG. 4, the monitoring module 420 monitors the outputs of the sensors 205 to check whether at least one sensor output indicates a magnetic field while waiting for the timer to reach a threshold time value. In the event the monitoring module 420 determines at step 620 that all of the sensor outputs return to the baseline state (i.e., none indicate a magnetic field), then the process returns to step 605 and no security action is initiated for this event. In the event the monitoring module 420 determines at step 620 that at least one of the sensor outputs indicates a magnetic field, then the process proceeds to step 625.

At step 625, the system determines whether the value of the timer is greater than a threshold time value (e.g., a first threshold). In embodiments, and as described with respect to FIG. 4, the monitoring module 420 compares the value of the timer to a predefined threshold time value. In the event the monitoring module 420 determines at step 625 that the timer value is less than the threshold time value, then the process returns to step 620 with the timer continuing to increment. In the event the monitoring module 420 determines at step 625 that the timer value exceeds the threshold time value, then the process proceeds to step 630.

At step 630, the system determines whether a number of sensors whose output indicates a magnetic field is equal to or greater than a threshold sensor number (e.g., a second threshold). In embodiments, and as described with respect to FIG. 4, the monitoring module 420 determines a number of sensors whose output indicates a magnetic field and compares this number to a predefined threshold sensor number. In the event the monitoring module 420 determines at step 630 that the number of sensors whose output indicates a magnetic field is less than the threshold sensor number, then the process returns to step 605 and no security action is initiated for this event. In the event the monitoring module 420 determines at step 630 that the number of sensors whose output indicates a magnetic field equals or exceeds the threshold sensor number, then the process proceeds to step 635.

At step 635, the system determines a security action to perform. In embodiments, and as described with respect to FIG. 4, the monitoring module 420 determines the security action from the configuration data 645 (which is the configuration data 415 of FIG. 4). The security action may include one or more of: disabling the keypad 200; sending an alert to a user device 425; activating an internal security device such as a camera 430 that is integrated with the device 405; and activating an external security device 435 such as a camera that is pointed at the device 405 but that is not part of or connected to the device 405.

At step 640, the system initiates the security action that was determined at step 635. In embodiments, and as described with respect to FIG. 4, the monitoring module 420 transmits data to the appropriate device(s) that cause the device(s) to execute the security action.

Figure 7:
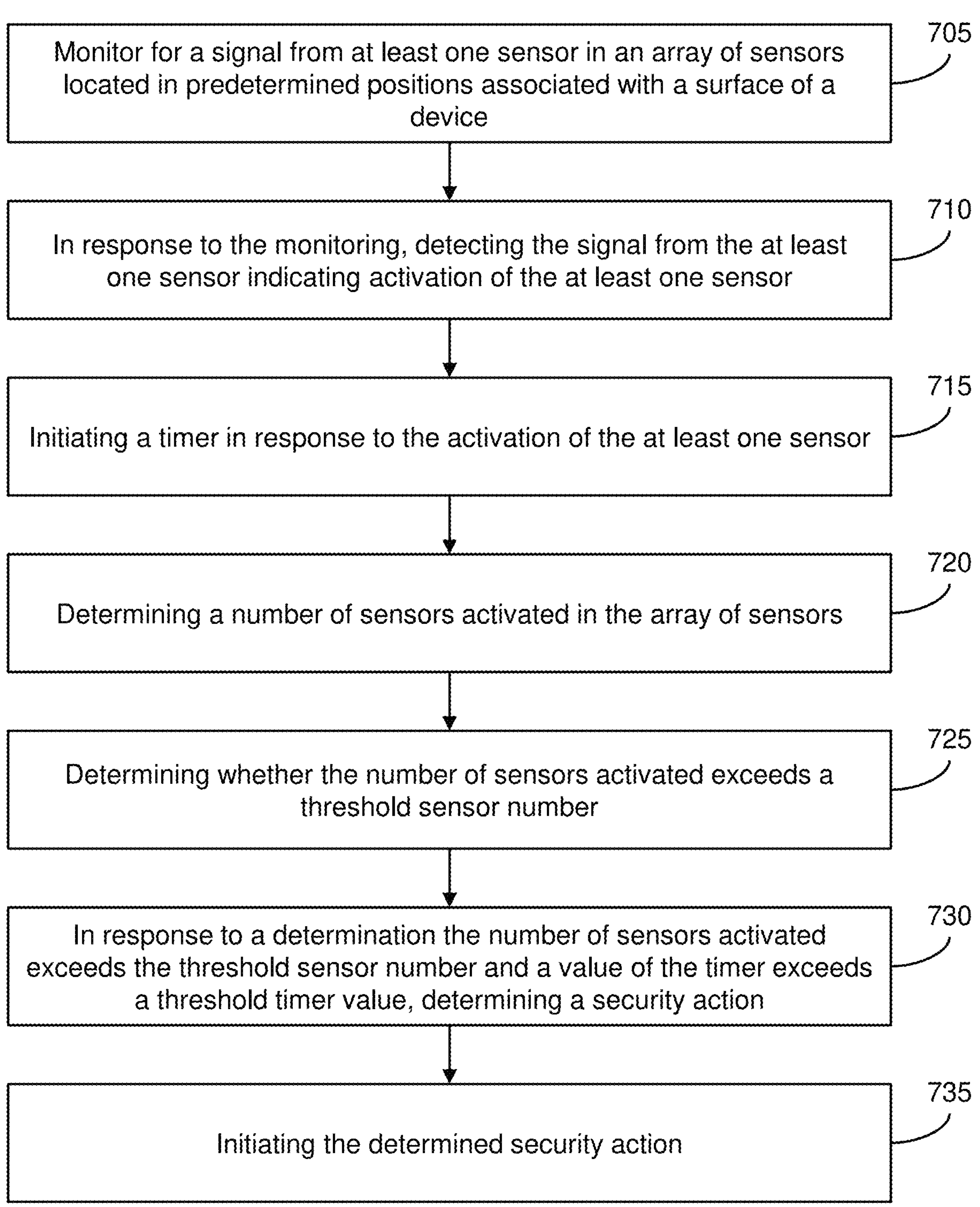
FIG. 7 shows a flowchart of another exemplary method in accordance with aspects of the invention.

FIG. 7 shows a flowchart of another exemplary method in accordance with aspects of the present invention. Steps of the method may be carried out in the environments of FIGS. 4 and 5 and are described with reference to elements depicted in FIGS. 4 and 5.

At step 705, the system (e.g., the monitoring module 420) monitors for a signal from at least one sensor in an array of sensors 205 located in predetermined positions associated with a surface of a device (e.g., keypad 200). As shown in FIG. 2, the sensors 205 may be arranged in an array located in predetermined positions associated with the surface of the keypad 200. At step 710, in response to the monitoring of step 705, the system (e.g., the monitoring module 420)

detects the signal from the at least one sensor indicating activation of the at least one sensor. At step 715, in the system (e.g., the monitoring module 420) initiates a timer in response to the detecting the activation of the at least one sensor at step 710. At step 720, the system (e.g., the monitoring module 420) determines a number of sensors activated in the array of sensors. At step 725, the system (e.g., the monitoring module 420) determines whether the number of sensors activated (as determined at step 720) exceeds a threshold sensor number. At step 730, in response to a determination the number of sensors activated exceeds the threshold sensor number and a value of the timer exceeds a threshold timer value, the system (e.g., the monitoring module 420) determines a security action. At step 735, the system (e.g., the monitoring module 420) initiates the determined security action.

In accordance with additional aspects of the invention, the determining the security action at step 730 comprises calculating a risk value and then selecting the security action from plural predefined the security actions based on the calculated risk value. In embodiments, the risk value is calculated based on a predefined risk appetite for this device and the number of sensors determined as being activated at step 720. The risk appetite may be defined by data stored in the configuration data 415 of FIG. 4. In embodiments, the risk value is calculated using a formula or algorithm that generates the risk value proportional to the predefined risk appetite and the number of sensors determined as being activated. For example, the formula or algorithm may be configured such that a lower risk appetite causes the risk value to be lower and a higher risk appetite causes the risk value to be higher. Additionally, the formula or algorithm may be configured such that a lower number of sensors determined as activated causes the risk value to be lower and a higher number of sensors activated causes the risk value to be higher.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for detecting an overlay on a device, the computer program product comprising one or more computer readable storage media having program instructions collectively stored on the one or more computer readable storage media, the program instructions executable to:

monitor signals from an array of magnetic field sensors in or on a keypad of the device;

in response to the monitoring, detect a signal from at least one sensor of the array of magnetic field sensors indicating activation of the at least one sensor;

initiate a timer in response to the activation of the at least one sensor;

determine a number of sensors activated in the array of magnetic field sensors;

determine whether the number of sensors activated exceeds a threshold sensor number;

in response to a determination the number of sensors activated exceeds the threshold sensor number and a value of the timer exceeds a threshold timer value, determine a security action; and initiate the security action.

2. The computer program product of claim 1, wherein the determining the security action comprises calculating a risk value.

3. The computer program product of claim 2, wherein the determining the security action comprises selecting the security action from plural predefined security actions based on the calculated risk value.

4. The computer program product of claim 3, wherein the plural predefined security actions include:

disabling the device;

sending an alert to a user device;

activating a camera that is integrated with the device; and activating a camera that is external to and pointed at the device.

5. The computer program product of claim 2, wherein the risk value is calculated based on a predefined risk appetite of the device and the number of sensors activated.

6. The computer program product of claim 1, wherein the at least one sensor comprises a Hall sensor.

7. The computer program product of claim 1, wherein the keypad is included in an automated teller machine.

8. The computer program product of claim 1, wherein the risk value is calculated based on the number of sensors activated such that a lower number of sensors determined as activated causes the risk value to be lower and a higher number of sensors activated causes the risk value to be higher.

9. The computer program product of claim 1, wherein the magnetic field sensors are configured to detect when a fake keypad is magnetically attached to the keypad.

10. A computer program product for detecting an overlay on a device, the computer program product comprising one or more computer readable storage media having program instructions collectively stored on the one or more computer readable storage media, the program instructions executable to:

monitor for a signal from at least one sensor in an array of sensors located in predetermined positions associated with a surface of the device;

in response to the monitoring, detect the signal from the at least one sensor indicating activation of the at least one sensor;

initiate a timer in response to the activation of the at least one sensor;

determine a number of sensors activated in the array of sensors;

determine whether the number of sensors activated exceeds a threshold sensor number;

in response to a determination the number of sensors activated exceeds the threshold sensor number and a value of the timer exceeds a threshold timer value, determine a security action; and initiate the security action, wherein the device comprises a keypad and the keypad is included in an electronic door lock.

11. A system comprising:

a processor, a computer readable memory, one or more computer readable storage media, and program instructions collectively stored on the one or more computer readable storage media, the program instructions executable to:

monitor for a signal from at least one sensor in an array of sensors located in predetermined positions associated with a surface of a keypad, wherein each of the sensors is a magnetic field sensor;

in response to the monitoring, detect the signal from the at least one sensor indicating activation of the at least one sensor;

initiate a timer in response to the activation of the at least one sensor;

determine a number of sensors activated in the array of sensors;

determine whether the number of sensors activated exceeds a threshold sensor number;

in response to a determination the number of sensors activated exceeds the threshold sensor number and a value of the timer exceeds a threshold timer value, determine a security action; and initiate the security action.

12. The system of claim 11, wherein the determining the security action comprises calculating a risk value.

13. The system of claim 12, wherein the determining the security action comprises selecting the security action from plural predefined security actions based on the calculated risk value.

14. The system of claim 13, wherein the plural predefined security actions include:

disabling the keypad;

sending an alert to a user device;

activating a camera that is integrated with a device containing the keypad; and activating a camera that is external to and pointed at the device containing the keypad.

15. The system of claim 12, wherein the risk value is calculated based on a predefined risk appetite of a device containing the keypad.

16. The system of claim 12, wherein the risk value is calculated based on a predefined risk appetite of a device containing the keypad and the number of sensors activated.

17. The system of claim 12, wherein the risk value is calculated using a formula or algorithm that generates the risk value proportional to a predefined risk appetite and the number of sensors activated.

18. The system of claim 11, wherein each of the sensors is a Hall sensor.

19. The system of claim 11, wherein the keypad is included in an electronic door lock.

20. The system of claim 11, wherein the keypad is included in an automated teller machine.

* * * * *